United States Patent
Hoersch

(10) Patent No.: US 9,428,155 B1
(45) Date of Patent: Aug. 30, 2016

(54) JACKING SYSTEM FOR A UTILITY VEHICLE

(71) Applicant: IVECO MAGIRUS AG, Ulm (DE)

(72) Inventor: Heiner Hoersch, Langenau (DE)

(73) Assignee: IVECO MAGIRUS AG, Ulm (DE)

( * ) Notice: Subject to any disclaimer, the term of this patent is extended or adjusted under 35 U.S.C. 154(b) by 0 days.

(21) Appl. No.: 15/080,642

(22) Filed: Mar. 25, 2016

(30) Foreign Application Priority Data

Mar. 27, 2015 (EP) .................................... 15161501

(51) Int. Cl.
*B66C 23/80* (2006.01)
*B60S 9/10* (2006.01)
*B66F 17/00* (2006.01)

(52) U.S. Cl.
CPC . *B60S 9/10* (2013.01); *B66F 17/00* (2013.01)

(58) Field of Classification Search
CPC ................................ B66C 23/80; E02F 9/085
See application file for complete search history.

(56) References Cited

U.S. PATENT DOCUMENTS

2005/0236824 A1* 10/2005 Wissler ..................... B60S 9/10
 280/765.1

FOREIGN PATENT DOCUMENTS

| JP | 58145252 | A | 8/1983 |
| JP | 1141153 | A | 6/1989 |

OTHER PUBLICATIONS

European Search Report for EP Application No. 15161501.0 dated on Sep. 7, 2015, 2 pages.

\* cited by examiner

*Primary Examiner* — John Walters
*Assistant Examiner* — James Triggs
(74) *Attorney, Agent, or Firm* — Remarck Law Group PLC

(57) ABSTRACT

A jacking system for a utility vehicle comprises a telescopic beam suspended under the vehicle body which is extractable in a generally horizontal direction and tiltable by a tilting mechanism to lower the extracted outer support end to the ground, said tilting mechanism comprising a pivot support supporting the telescopic beam at the vehicle body pivotable around a horizontal axis and a support drive comprising an telescopic drive element of variable length, with a first end of the drive element being pivotably attached to the vehicle body and its opposite second end being supported at the telescopic beam at a position between the pivot support and the support end of the telescopic beam. This jacking system is characterized in that the tilting mechanism further comprises a lever arrangement for load transmission between the support drive and the telescopic beam, said lever arrangement comprising a first lever with a first end pivotably attached to the vehicle body at a first hinge point below the attachment point of the first end of the drive element at the vehicle body, and a second lever with a first end pivotably attached to a second end of the first lever at a second hinge point and a second end pivotably attached to the telescopic beam.

9 Claims, 5 Drawing Sheets

JACKING SYSTEM FOR A UTILITY VEHICLE

CROSS REFERENCE TO RELATED APPLICATIONS

This application claims priority to European Patent Application No. 15161501.0 filed on Mar. 27, 2015, the entire disclosure of which is incorporated herein by reference.

FIELD OF THE INVENTION

The present invention refers to a jacking system for a utility vehicle, according to the preamble of claim 1.

Utility vehicles, in particular such that are equipped with an aerial lifting apparatus, such as a turntable ladder, an elevating cage or the like, are often equipped with a jacking system for improving the stability of the vehicle body when the aerial apparatus reaches out in a lateral direction, and to prevent the vehicle from being tilted into this direction. One example for such a utility vehicle is a fire fighting vehicle equipped with a telescopic turntable ladder. Jacking systems of this kind comprise telescopic beams that are suspended under the vehicle body to be extractable in a generally horizontal direction. Each beam is provided to be supported on the ground in its extracted position. For this purpose these beams are usually equipped with support plates at their outer support ends.

BACKGROUND OF THE INVENTION

For lowering the end of each telescopic beam to the ground, the jacking system comprises a tilting mechanism, with a pivot support with a horizontal pivot axis around which the telescopic beam at the vehicle body can be inclined, and a support drive with a telescopic drive element, for example, a hydraulic cylinder. A first end of the telescopic drive element is pivotably attached to the vehicle body, and its opposite end is supported at the telescopic beam at a position between the pivot support and the support end of the telescopic beam. With other words, the telescopic beam is hinged to the vehicle body at the side opposite to the extracted outer support end, while the support drive is arranged to lower the outer support end to the ground by extracting the telescopic drive element. When the outer support end of the beam touches the ground, further actuation of the support drive acts to lift the vehicle body from its wheel suspensions and to take the reaction force from the ground. With multiple support beams at different positions around the vehicle, a safe stand of the system is provided.

Although this system works satisfactorily, certain problems are experienced with the load transmission from the ground into the vehicle body. Because of the relatively high attachment point of the telescopic drive element at the vehicle body, cross forces acting in a direction mainly perpendicular to the extension direction of the telescopic beam (i.e. parallel to the driving direction of the vehicle) are introduced into the telescopic drive element and its attachment points. Such cross forces occur typically in a situation in which the vehicle body is jacked on a ground that has a strong inclination in the driving direction of the vehicle, for example, on a street with a strong upward or downward slope. These cross forces act laterally as shear forces or bending forces on the extension mechanism of the telescopic drive element, leading to poor stability and increased wear of its moving parts, and impairing its guiding properties in lifting or lowering the telescopic beam because of undesired tolerance in its components and their mutual interaction.

Moreover, cross forces acting in a generally horizontal direction along the telescopic beam are introduced mainly at the pivot support, at the opposite side of the vehicle body, because they cannot be fully absorbed by the telescopic drive element which has a relatively strong inclination with respect to the horizontal plane and the telescopic beam. For reasons of constructional design, it is difficult or at least disadvantageous to introduce these forces into the lower part of the frame work of the vehicle body.

SUMMARY OF THE INVENTION

It is therefore an object of the present invention to improve the known jacking systems as described above under the aspect of introduction of loads introduced from the telescopic beam into the vehicle body, including cross forces or shear forces acting on the telescopic drive element occurring when the utility vehicle is jacked on a sloped ground, and also linear forces acting along the telescopic beam.

This object is achieved by a jacking system comprising the features of claim 1.

In the jacking system according to the present invention, the tilting mechanism for lowering the expected outer support end of the telescopic beam comprises an additional lever arrangement for load transmission between the support drive and the telescopic beam. This lever arrangement comprises a first lever and a second lever. The first end of the first lever is pivotably attached to the vehicle body at a first hinge point that is disposed below the attachment point of the first end of the drive element at the vehicle body. A second end of the first lever is pivotably attached to a first end of the second lever. The opposite second end of the second lever is pivotably attached to the telescopic beam.

This lever arrangement is able to take a major part of the horizontal shear forces acting laterally to the telescopic beam and also along its extension direction, which would be otherwise transferred to the telescopic drive element, as it is the case in the jacking systems known from the state of the art. Cross forces acting on the telescopic drive element can be avoided in this construction. The first lever may have a solid construction to provide sufficient stability against shear forces or bending forces acting laterally to the telescopic beam, so as to transmit them as compressive forces into the vehicle body.

According to a preferred embodiment of the present invention, the second end of the telescopic drive element is pivotably attached to the first lever. In this arrangement the telescopic drive element pushes down the first lever when it is extracted, such as to press down the telescopic beam via the lever arrangement.

More preferably the second end of the telescopic drive element is pivotably attached to the second hinge point, which connects the first lever with the second lever. The geometry of this arrangement is such that the telescopic drive element, the first lever and the vertical distance between the (upper) attachment point of the drive element at the vehicle body and the (lower) first hinge point, which is the attachment point of the first end of the first lever at the vehicle body, form a triangle, with one side of this triangle formed by the telescopic drive element so that it has a variable length. If this length is increased by extracting the telescopic drive element, the first lever is pivoted in a downward direction around the first hinge point, with the consequence that the second hinge point (at which the first lever and the second end of the drive element are connected) is lowered relative to the vehicle body.

According to another preferred embodiment of the present invention, the first lever is arranged in a generally horizontal position, and the second lever is arranged in a generally vertical position.

According to another preferred embodiment of the present invention, the length of the first lever is multiple of the length of the second lever.

More preferably, the drive element is at a hydraulic cylinder.

According to another preferred embodiment of the present invention, the second end of the second lever is pivotably attached to the telescopic beam by a hinge comprising two parallel flanges protruding vertically on top of the telescopic beam and a horizontal hinge axis extending between them for supporting the second end of the second lever.

According to still another preferred embodiment of the present invention, the first end of the first lever is pivotably attached to the vehicle body by a hinge comprising each two parallel vertical flanges and a horizontal hinge axis extending between them for supporting the vehicle body.

According to still another preferred embodiment of the present invention, the second end of the first lever is pivotably attached to the second end of the drive element as well as to the first end of the second lever by a hinge comprising each two parallel vertical flanges and a horizontal hinge axis extending between them for supporting second end of the drive element and the first end of the second lever.

BRIEF DESCRIPTION OF THE DRAWINGS

These and other aspects of the present invention will be apparent from and elucidated with reference to embodiments of the present invention described in the following figures.

DETAILED DESCRIPTION OF THE INVENTION

Figure 1:
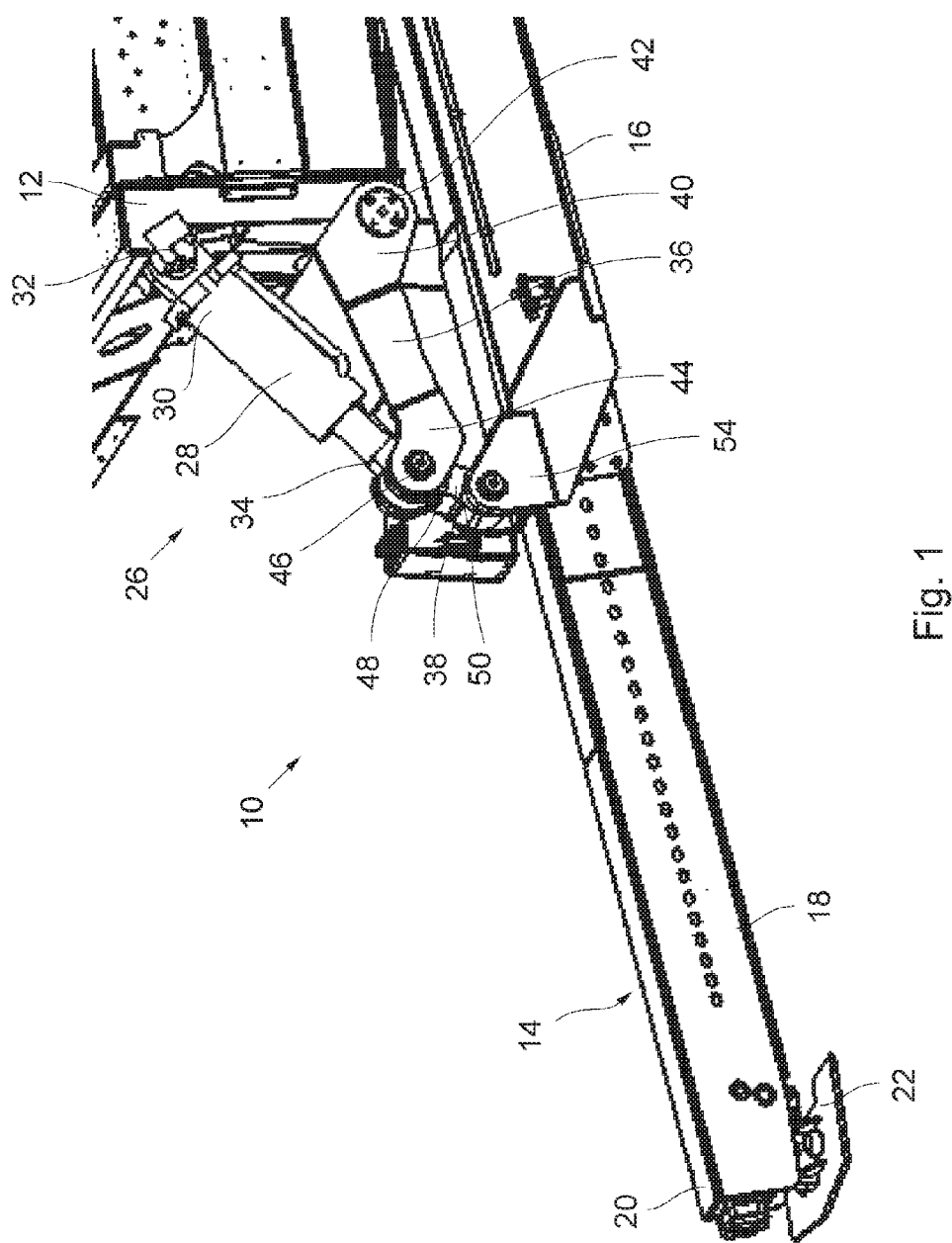
FIG. 1 is a perspective detailed view of one embodiment of a jacking system according to the present invention.

FIG. 1 shows a jacking system 10 of a utility vehicle which is shown only in parts, including the rear left corner of the vehicle body 12, viewed from a top left rear position. The jacking system 10 comprises a telescopic beam generally denoted by reference number 14, with one section 16 suspended under the vehicle body 12 and another section 18 being extractable and retractable with respect to the first section 14, such that the telescopic beam 14 has a variable length. The telescopic beam 14 has a free outer support end 20 that can be lowered to the ground, as will be further explained in the following. At its bottom side, this support end 20 comprises a support plate 22 to rest on the ground in the jacked position.

Such telescopic beams 14 as shown in FIG. 1 are provided at four different positions of the vehicle, with one pair of two beams to be extracted to each left and right side of the vehicle, to enlarge its support area.

Jacking of the vehicle is performed by tilting the telescopic beams 14 in a downward direction such that the support ends 20 touch the ground with their support plates 22. With increasing inclination, the wheel suspensions of the vehicle are unloaded, and the main portion of the load of the vehicle body 12 rests on the telescopic beams 14 such that the load acting from the ground and transmitted along the telescopic beam 14 is introduced into the vehicle body 12. The jacking system 10 according to the present invention operates to perform this tilting mechanism while transmitting and introducing the loads in a favorable way into the vehicle body 12.

Figure 2:
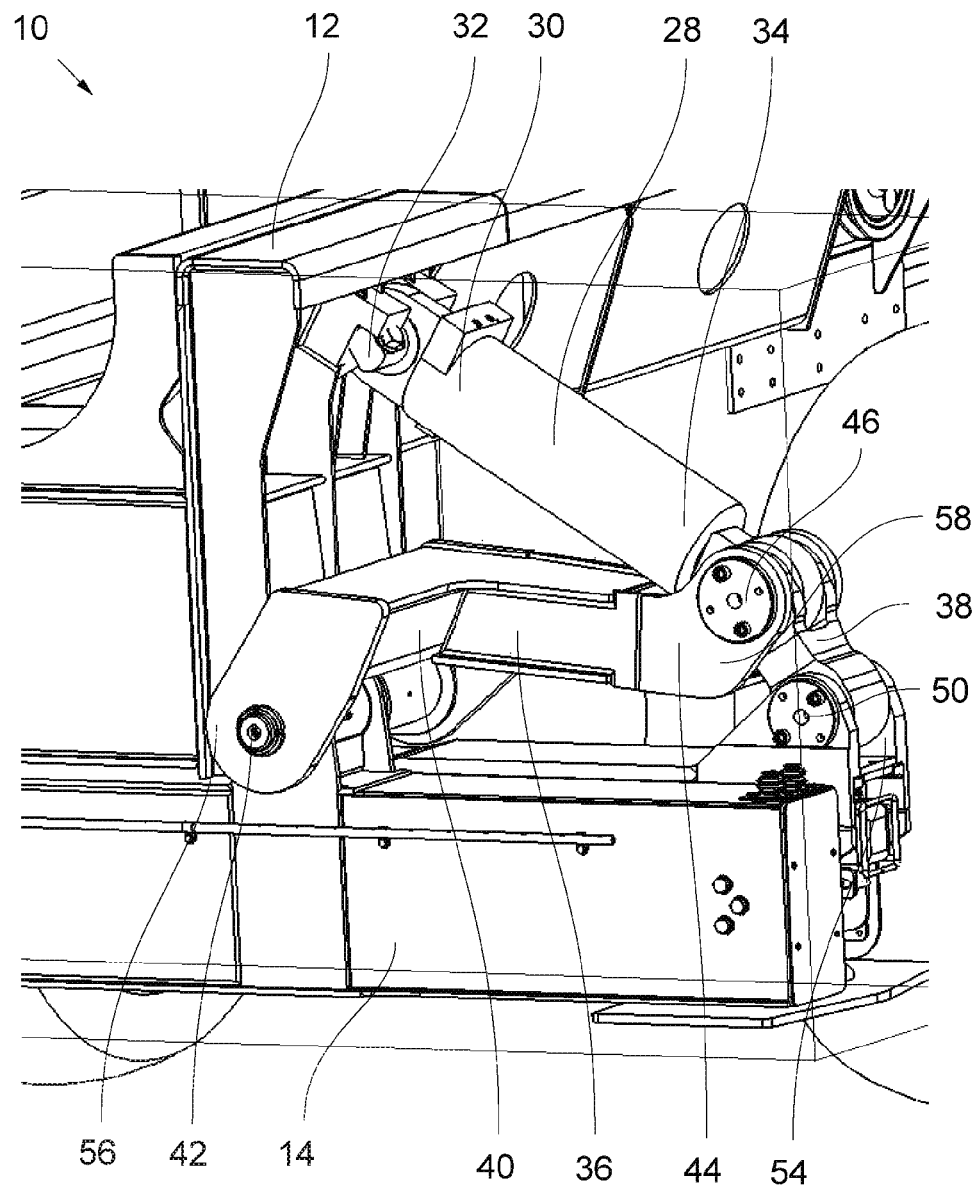
FIG. 2 is a perspective view of the embodiment of the jacking system according to the present invention shown in FIG. 1, with the telescopic beam being in its retracted position.
Figure 3:
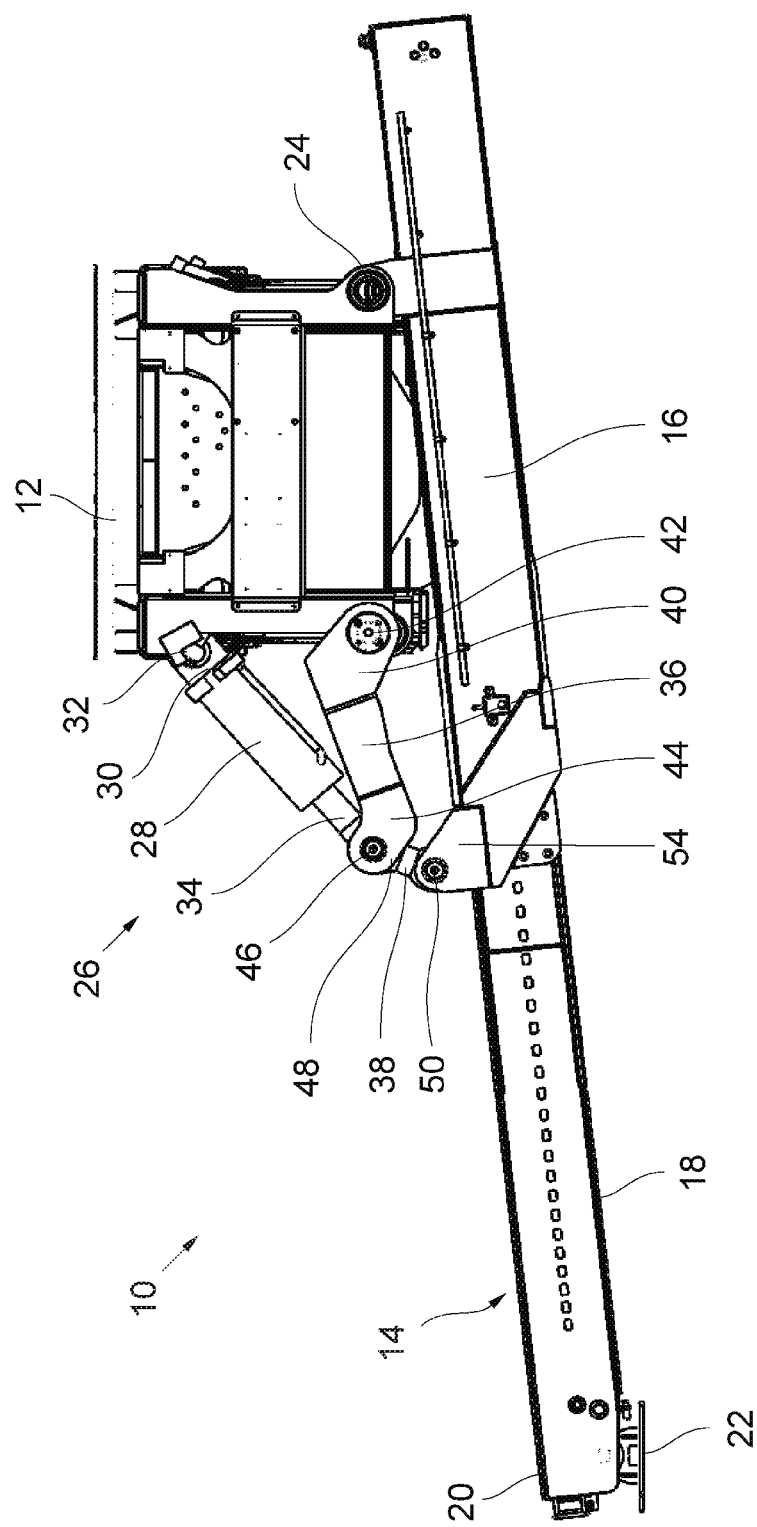
FIG. 3 is a rear view of a utility vehicle comprising a jacking system as demonstrated in FIGS. 1 and 2.

According to FIGS. 1, 2 and 3, the tilting operation of the respective telescopic beam 14 to lower its outer support end 20 is performed by a tilting mechanism which comprises a pivot support (not visible in FIGS. 1 and 2 but shown in FIG. 3) that supports the telescopic beam 14 at the vehicle body 12 pivotable around a horizontal axis. Around the pivot support 24, the telescopic beam 14 can perform a turning movement around the horizontal axis such that the support end 20 is lifted or lowered, as can be taken from FIG. 3. The pivot support 24 is arranged at a side of the vehicle body 12 that is averted from the support end 20. At the opposite side of the vehicle body 12 facing the support end 20, a support drive 26 is arranged for driving the tilting movement. For this purpose, the support drive 26 comprises a telescopic drive element of variable length, which is a hydraulic cylinder 28 in the present embodiment. It is noted that the hydraulic cylinder 28 can be replaced against any other suitable telescopic drive element, if desired. In the following description, reference will be made to the hydraulic cylinder 28 for better understanding, representing any other suitable drive element of variable length.

The hydraulic cylinder 28 is disposed in an inclined angle, with one of its ends, namely the one facing the vehicle body 12, being a first end 30 being pivotably attached to the vehicle body 12 such that the hydraulic cylinder 28 can perform a tilting movement around a horizontal axis running through the attachment point 32 (see also FIG. 4) of the first end 30 of the hydraulic cylinder 28. The opposite end of the hydraulic cylinder 28 facing the support end 20 of the telescopic beam 14 will be denoted as its second end 34 in the following, being arranged in a position lower than its first end 30.

This second end 34 of the hydraulic cylinder 28 is supported at the telescopic beam 14 at the position between the pivot support 24 and the support end 20 of the telescopic beam 14 by means of lever arrangement for load transmission between the support drive 26 and the telescopic beam 14.

This lever arrangement comprises a first lever 36, which connects the second (lower) end of the hydraulic cylinder 28 with a lower portion of the vehicle body 12, as will be explained further in more detail, and a second lever 38 being connected, on one hand, with the second end 34 of the hydraulic cylinder 28 and the first lever 36, and on the other hand, with the telescopic beam 14. While the first lever 36 is disposed in a generally horizontal position, the second lever 38 is arranged in a generally vertical position.

A first end 40 of the first lever 36 is attached to the vehicle body 12 at a first hinge point 42 below the attachment point 32 of the first end 30 of the hydraulic cylinder 28 at the vehicle body 12, such that there is a vertical distance between the upper attachment point 32 of the hydraulic cylinder 28 and the lower attachment point, i. e. the first hinge point 42 of the first lever 36 at the vehicle body. The other end of the first lever 36, which is its second end 44, is in turn pivotably attached to the second end 34 of the hydraulic cylinder 28 at a second hinge point 46. As can be taken from FIG. 4, the hydraulic cylinder 28, the first lever 36 and the vertical distance between the attachment point 32 and the first hinge point 42 form a triangle. By changing the length of the hydraulic cylinder 28, the length of one side of this triangle is increased, with the effect that its edge facing the support end 20, which is the second hinge point 46, is lowered with respect to the vehicle body 12. At the same time, the first lever 36 is further inclined towards the ground, while it is turned around the first hinge point 42.

The opposite second hinge point 46 is at the same time an attachment point for a first end 48 (an upper end) of the second lever 38, such that the second lever 38 is pivotably attached with its first end 48 to the second end 44 of the first lever 36 at the second hinge point 46. The opposite lower end of the second lever 38, i. e. its second end 50, is pivotably attached to the top of the telescopic beam 14.

The precise shape of the first lever 36 and second lever 38 is not important for the operation of the jacking system 10 according to the present invention, as long as there is a reliable load transmission from the telescopic beam 14 into the vehicle body 12, as will be explained further in more detail. For example, the first lever 36 does not necessarily have a shape of cross section of a longitudinal bar but can derive from such a simple shape. In the same way, different attachment points, hinge points and supports can have any desired shape as long as they can perform the necessary support and tilting operations of the respective connected parts with respect to each other. In the present embodiment as demonstrated in particular in FIG. 2, the second end 44 of the first lever 36 comprises two parallel vertical flanges 58 supporting a horizontal hinge axis between them, on which the second end 34 of the hydraulic cylinder 28 as well as the first end 48 of the second lever 38 are pivotably supported, forming the a hinge representing the second hinge point 46. In the same way, the opposite first end 40 of the first lever 36 comprises two parallel vertical flanges 56 supporting a horizontal hinge axis between them, forming a hinge representing the first hinge point 42 connecting the first lever 36 with the vehicle body 12. The second end 50 of the second lever 38 is as well pivotably attached to the top of the telescopic beam 14 by a hinge that comprising two parallel flanges 54 protruding vertically on top of the telescopic beam 14 and a horizontal hinge axis extending between them.

Figure 4:
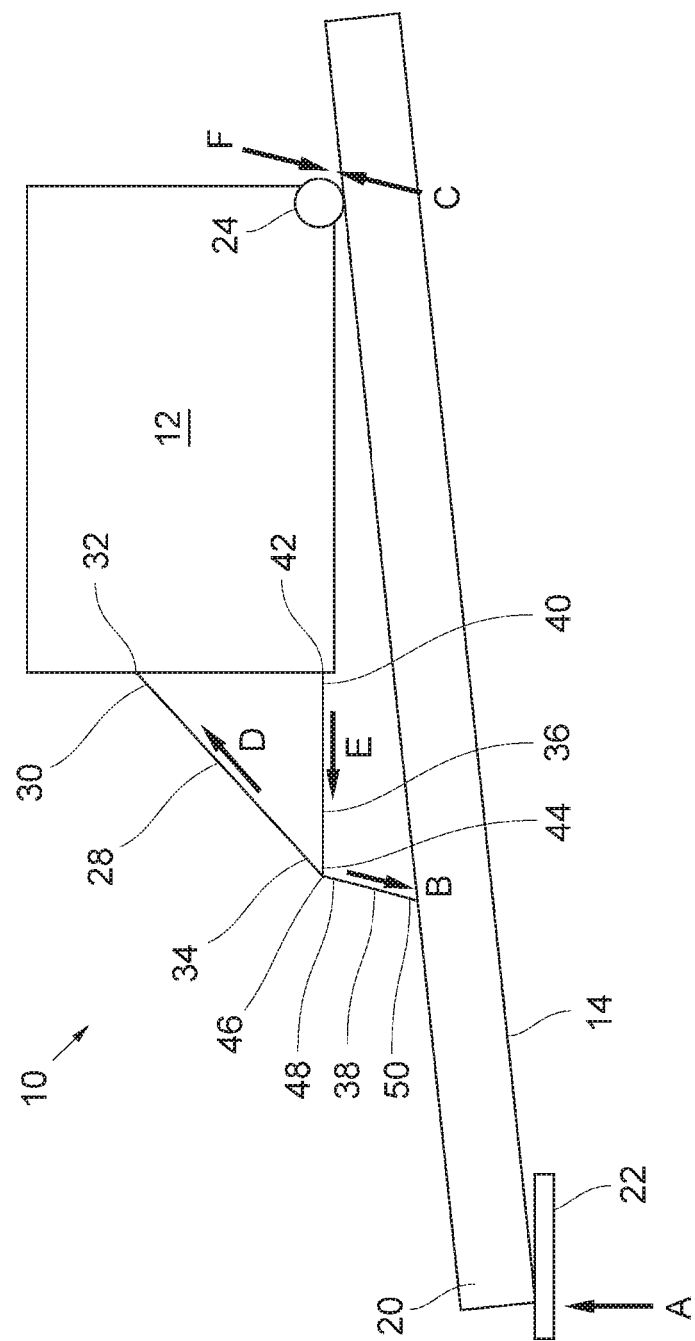
FIG. 4 is a schematic view of the geometric relations and transmitted loads and forces of the jacking system as demonstrated in FIG. 3, from the same perspective.

In FIGS. 3 and 4, the transmission and introduction of loads from the telescopic beam 14 into the vehicle body 12 is explained by means of arrows demonstrating the directions of loads. In these figures, the arrow A demonstrates a reaction force from the ground introduced via the ground support plate 22 into the support end 20 of the extracted and lowered telescopic beam 14. The resulting reaction force acting on the telescopic beam 14 at the attachment position of the second lever 38 is demonstrated by downward arrow B, while the corresponding reaction force acting on the pivot support 24 at the opposite side of the vehicle body 12 is demonstrated by arrow C. The corresponding reaction forces on the vehicle body 12 are demonstrated by arrows D (along the hydraulic cylinder 28 towards the attachment point 32), arrow E (along the first lever 36 towards the second hinge point 46) and arrow F (acting at the pivot support 24, opposite to arrow C).

Bending loads are introduced into the vehicle body 12 mainly on the side facing the support end 20 (which is the left side in FIG. 4), while the pivot support 24 is unloaded to the same extend. This is due to the lever arrangement of the tilting mechanism. The forces acting on the pivot support 24 act in a mainly vertical direction, being favorable for constructional reasons compared to forces acting as horizontal forces at the pivot support 24.

Figure 5:
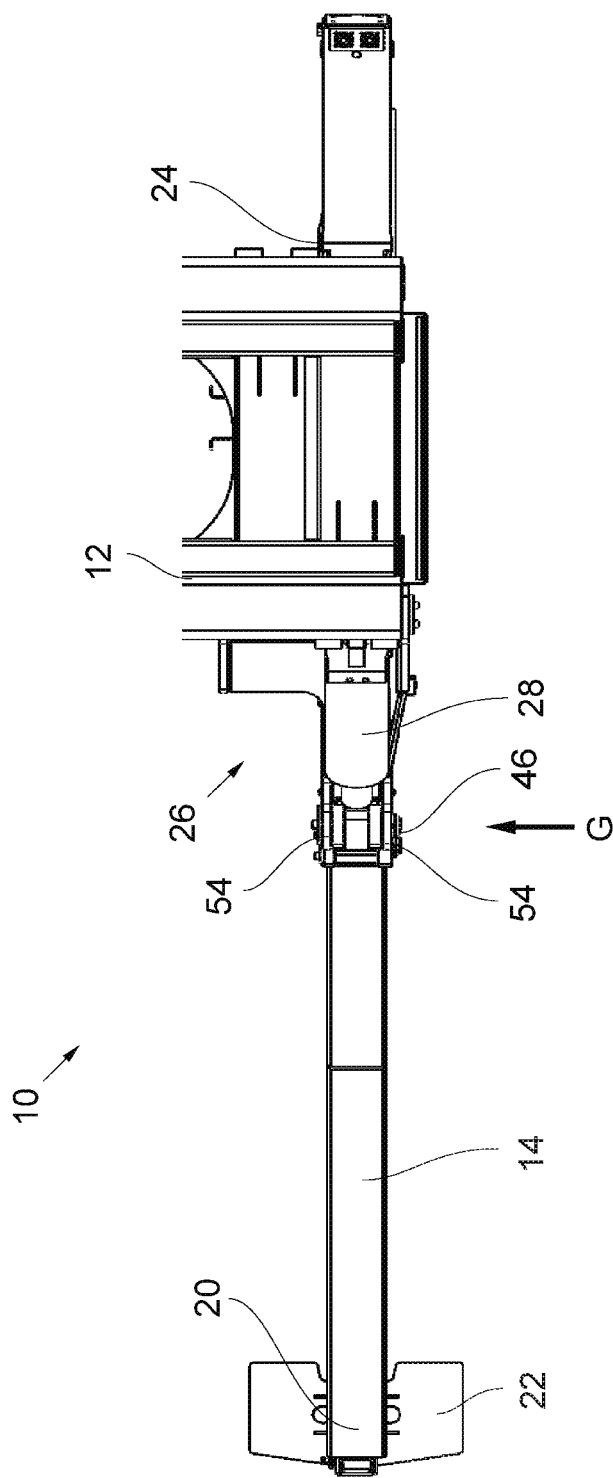
FIG. 5 is a top view of the embodiment of the jacking system according to the present invention as shown in the preceding figures.

The top view in FIG. 5 demonstrates how lateral cross forces that act mainly perpendicular to the extension direction or driving direction of the vehicle are absorbed in the present jacking system 10. Such a cross force, indicated in FIG. 5 by an arrow G, may occur if the vehicle is positioned at an uphill slope such that its weight acts to pull the vehicle body in the rearward direction. The cross force G is introduced via the second lever 38 and the first lever 36 into the vehicle body 12. Because of the strong and stable construction of the hinge connecting the second lever 38 with the telescopic beam 14, the hinge at the second hinge point 46 connecting the second lever 38 with the first lever 36 and the hinge at the first hinge point 42 connecting the first lever 36 with the vehicle body 12, the cross force G is mainly absorbed by the lever arrangement, unloading the hydraulic cylinder 28 from such cross forces.

The invention claimed is:

1. Jacking system (10) for a utility vehicle, comprising a telescopic beam (14) suspended under the vehicle body (12) which is extractable in a generally horizontal direction and tiltable by a tilting mechanism to lower the extracted outer support end (20) to the ground, said tilting mechanism comprising:
   a pivot support (24) supporting the telescopic beam (14) at the vehicle body 12) pivotable around a horizontal axis,
   and a support drive (26) comprising an telescopic drive element (28) of variable length, with a first end (30) of the drive element (28) being pivotably attached to the vehicle body (12) and its opposite second end (34) being supported at the telescopic beam (14) at a position between the pivot support (24) and the support end (20) of the telescopic beam (14),
   characterized in that the tilting mechanism further comprises a lever arrangement for load transmission between the support drive (26) and the telescopic beam (14), said lever arrangement comprising:
   a first lever (36) with a first end (40) pivotably attached to the vehicle body (12) at a first hinge point (42) below the attachment point of the first end (30) of the drive element (28) at the vehicle body (12),
   and a second lever (38) with a first end (48) pivotably attached to a second end (44) of the first lever (36) at a second hinge point (46) and a second end (50) pivotably attached to the telescopic beam (14).

2. Jacking system according to claim 1, characterized in that the second end (34) of the telescopic drive element (28) is pivotably attached to the first lever (36).

3. Jacking system according to claim 1, characterized in that the second end (34) of the telescopic drive element (28) is pivotably attached to the second hinge point (46).

4. Jacking system according to claim 1, characterized in that the first lever (36) is arranged in a generally horizontal position, and the second lever (38) is arranged in a generally vertical position.

5. Jacking system according to claim 1, characterized in that the length of the first lever (36) is a multiple of the length of the second lever (38).

6. Jacking system according to claim 1, characterized in that the drive element (28) is a hydraulic cylinder.

7. Jacking system according to claim 1, characterized in that the second end (50) of the second lever (38) is pivotably attached to the telescopic beam (14) by a hinge comprising two parallel flanges (54) protruding vertically on top of the telescopic beam (14) and a horizontal hinge axis extending between them for supporting the second end (50) of the second lever (38).

8. Jacking system according to claim 1, characterized in that the first end (40) of the first lever (36) is pivotably attached to the vehicle body (12) by a hinge comprising each two parallel vertical flanges (56) and a horizontal hinge axis extending between them for supporting the vehicle body (12).

9. Jacking system according to claim 1, characterized in that the second end (44) of the first lever (36) is pivotably attached to the second end (34) of the drive element (28) as well as to the first end (48) of the second lever (38) by a hinge comprising each two parallel vertical flanges (58) and a horizontal hinge axis extending between them for supporting second end (34) of the drive element (28) and the first end (48) of the second lever (38).

\* \* \* \* \*